(12) United States Patent
Chuang et al.

(10) Patent No.: US 11,890,562 B2
(45) Date of Patent: Feb. 6, 2024

(54) FILTERING MODULE

(71) Applicant: Ye Siang Enterprise Co., Ltd., New Taipei (TW)

(72) Inventors: Shih-Chieh Chuang, New Taipei (TW); Wei-Kuo Kong, New Taipei (TW); Shih-Hsien Chuang, New Taipei (TW)

(73) Assignee: Ye Siang Enterprise Co., Ltd., New Taipei (TW)

( * ) Notice: Subject to any disclaimer, the term of this patent is extended or adjusted under 35 U.S.C. 154(b) by 425 days.

(21) Appl. No.: 17/155,103

(22) Filed: Jan. 22, 2021

(65) Prior Publication Data

US 2021/0346829 A1 Nov. 11, 2021

Related U.S. Application Data

(60) Provisional application No. 63/021,666, filed on May 7, 2020.

(30) Foreign Application Priority Data

Oct. 6, 2020 (TW) ................................ 109134649

(51) Int. Cl.
*B01D 46/00* (2022.01)
*B01D 46/16* (2006.01)
(Continued)

(52) U.S. Cl.
CPC ......... *B01D 46/0002* (2013.01); *B01D 39/08* (2013.01); *B01D 46/0049* (2013.01);
(Continued)

(58) Field of Classification Search
None
See application file for complete search history.

(56) References Cited

U.S. PATENT DOCUMENTS 2,252,724 A * 8/1941 Myers ............... B01D 46/12
55/504
2,334,802 A * 11/1943 Zuckermann .......... B01D 35/04
210/284

(Continued)

FOREIGN PATENT DOCUMENTS

CN 2492793 Y 5/2002
CN 101868291 A 10/2010
(Continued)

*Primary Examiner* — Brit E. Anbacht
(74) *Attorney, Agent, or Firm* — CKC & Partners Co., LLC (57) ABSTRACT

A filtering module includes at least one reinforced aluminum side plate and at least one filtering mesh. The reinforced aluminum side plate surrounds to form a rectangular frame. The reinforced aluminum side plate includes a top plate, a connecting plate, a base plate and a positioning plate. The connecting plate is connected between the top plate and the base plate. The base plate and the top plate are substantially parallel with each other. The base plate has a treated surface away from the top plate and configured to abut against a fan filtering unit. The top plate has a supporting surface away from the base plate. The positioning plate is disposed perpendicularly on the supporting plate and aligns with the connecting plate. The filtering mesh is at least partially supported on the supporting surface and at least partially abuts against the positioning plate.

11 Claims, 9 Drawing Sheets

(51) Int. Cl.
    *B01D 3/08*    (2006.01)
    *F24F 8/108*    (2021.01)
    *F24F 3/16*    (2021.01)
    *B01D 46/58*    (2022.01)
    *B01D 39/08*    (2006.01)
    *F24F 3/06*    (2006.01)

(52) U.S. Cl.
    CPC ............. *B01D 46/16* (2013.01); *B01D 46/58* (2022.01); *F24F 3/06* (2013.01); *F24F 8/108* (2021.01); *B01D 2265/06* (2013.01); *B01D 2267/30* (2013.01); *B01D 2273/30* (2013.01); *B01D 2279/51* (2013.01)

(56) References Cited

U.S. PATENT DOCUMENTS

| | | | | |
|---|---|---|---|---|
| 3,350,862 A * | 11/1967 | Nutting | ............. | B01D 46/0005 55/484 |
| 3,386,580 A * | 6/1968 | Grabarczyk | ........... | B01D 46/12 209/408 |
| 3,707,046 A * | 12/1972 | De Baun | ................ | B01D 46/12 55/483 |
| 3,884,662 A * | 5/1975 | Hladik | ................... | B01D 46/16 55/502 |
| 3,938,973 A * | 2/1976 | Kershaw | ................ | F24F 13/28 55/501 |
| 4,023,944 A * | 5/1977 | Beane | .................... | B01D 46/10 55/482 |
| 4,129,429 A * | 12/1978 | Humbert, Jr. | ........ | B01D 46/121 210/493.1 |
| 4,269,615 A * | 5/1981 | Zboralski | ............... | B01D 46/10 55/480 |
| 4,277,267 A * | 7/1981 | Posner | ................... | B01D 46/10 55/494 |
| 4,419,113 A * | 12/1983 | Smith | ..................... | F01N 3/021 422/562 |
| 4,420,315 A * | 12/1983 | Kershaw | ................ | B01D 46/00 29/469 |
| 4,636,233 A * | 1/1987 | Lizmore | ............ | B01D 46/0002 229/172 |
| 4,946,480 A * | 8/1990 | Hauville | ............ | B01D 53/0423 55/482 |
| 5,332,409 A * | 7/1994 | Dralle | .................... | B01D 46/84 55/497 |
| 5,395,429 A * | 3/1995 | Sutsko | ............... | B01D 39/1692 55/502 |
| 5,800,588 A * | 9/1998 | Miller | .................... | B01D 46/62 55/494 |
| 5,853,445 A * | 12/1998 | Wong | .................... | B01D 46/62 55/502 |
| 6,001,145 A * | 12/1999 | Hammes | .................. | A61L 9/16 55/471 |
| 6,033,454 A * | 3/2000 | Hoeffken | ............... | B01D 46/10 55/494 |
| 7,824,460 B2 * | 11/2010 | Schramm | ............... | F01N 3/0226 55/483 |
| 8,673,480 B2 * | 3/2014 | Barter | ................. | H01M 50/543 429/120 |
| 8,784,528 B2 * | 7/2014 | Gorman | ............. | B01D 46/0005 55/497 |
| 10,434,448 B1 * | 10/2019 | Honnecke | ............... | F24F 13/28 |
| 11,439,937 B2 * | 9/2022 | Vaidya | ..................... | F24F 8/108 |
| 2004/0148915 A1 * | 8/2004 | Lipner | ............... | B01D 46/0002 55/495 |
| 2007/0289274 A1 * | 12/2007 | Justice | ............... | B01D 46/0013 55/511 |
| 2008/0209868 A1 * | 9/2008 | Schramm | ............... | F01N 3/0226 156/292 |
| 2009/0183474 A1 * | 7/2009 | Workman | ............ | B01D 46/521 55/385.2 |
| 2009/0183477 A1 * | 7/2009 | Workman | ............... | B01D 46/10 55/495 |
| 2012/0060454 A1 * | 3/2012 | Banks | ................ | B01D 46/4227 55/493 |
| 2012/0060455 A1 * | 3/2012 | Lange | ................ | B01D 46/0005 55/497 |
| 2012/0131892 A1 * | 5/2012 | Cheng | .................... | B01D 46/62 55/476 |
| 2013/0291504 A1 * | 11/2013 | Gorman | ................. | B01D 46/10 55/509 |
| 2015/0298032 A1 * | 10/2015 | Tinkham | ................ | B01D 29/56 210/489 |
| 2017/0203247 A1 * | 7/2017 | Lee | ......................... | B01D 46/10 |
| 2018/0207572 A1 * | 7/2018 | Grimes | ................. | B01D 46/4245 |
| 2020/0238211 A1 * | 7/2020 | Lee | ...................... | B01D 46/0013 |
| 2020/0338487 A1 * | 10/2020 | Chuang | ................ | B01D 46/10 |
| 2021/0101102 A1 * | 4/2021 | Cheng | .................... | B01D 46/64 |
| 2023/0087781 A1 * | 3/2023 | Hurwitz | ................ | H03H 9/173 |

FOREIGN PATENT DOCUMENTS

| | | | | |
|---|---|---|---|---|
| CN | 102698511 A | | 10/2012 | |
| CN | 105210249 A | | 12/2015 | |
| CN | 205815279 U | | 12/2016 | |
| CN | 107304731 A | | 10/2017 | |
| CN | 107921163 A | | 4/2018 | |
| CN | 109715265 A | | 5/2019 | |
| CN | 209704938 U | | 11/2019 | |
| CN | 111821781 A | * | 10/2020 | ......... B01D 46/0002 |
| EP | 0541861 A1 | | 5/1993 | |
| ES | 2397598 A1 | | 3/2013 | |
| JP | 2010-175099 A | | 8/2010 | |
| JP | 3207558 U | * | 11/2016 | ............ B01D 29/05 |
| TW | M544361 U | | 7/2017 | |
| TW | I655026 B | | 4/2019 | |

* cited by examiner

FILTERING MODULE

RELATED APPLICATIONS

This application claims priority to U.S. Provisional Application Ser. No. 63/021,666 filed May 7, 2020, and Taiwanese Application Serial Number 109134649 filed Oct. 6, 2020, which are herein incorporated by reference.

BACKGROUND

Technical Field

The present disclosure relates to filtering modules.

Description of Related Art

With the increase of living standards of people, electronic products have become an important part of daily lives. What is more, consumers become more and more concerned about the quality level of electronic products.

As a result, in order to enhance the quality of electronic products, apart from striving to improve the design of electronic products, the manufacturers also work to optimize the manufacturing environment during the manufacturing process of the electronic products, so as to guarantee the manufacturing quality of electronic products. Therefore, the method to effectively provide a dust-free space appropriate for the production of electronic products is undoubtedly an important issue which the industry highly concerns.

SUMMARY

A technical aspect of the present disclosure is to provide a filtering module, which can effectively enhance the degree of tightness between the first rectangular frame and the fan filtering unit.

According to an embodiment of the present disclosure, a filtering module includes a first reinforced aluminum side plate and at least one filtering mesh. The first reinforced aluminum side plate surrounds to form a first rectangular frame. The first reinforced aluminum side plate includes a first top plate, a first connecting plate, a base plate and a first positioning plate. The first connecting plate is connected between the first top plate and the base plate. The base plate and the first top plate are substantially parallel with each other. The base plate has a treated surface. The treated surface is away from the first top plate and is configured to abut against a fan filtering unit. The first top plate has a first supporting surface away from the base plate. The first positioning plate is disposed perpendicularly on the first supporting surface and aligns with the first connecting plate. The filtering mesh is at least partially supported on the first supporting surface and at least partially abuts against the first positioning plate.

In one or more embodiments of the present disclosure, the treated surface is a flat surface.

In one or more embodiments of the present disclosure, an edge of the first top plate facing to an inner side of the first rectangular frame defines a first vent. A dimension of the filtering mesh is larger than a dimension of the first vent.

In one or more embodiments of the present disclosure, the filtering mesh is a frameless filtering cloth.

In one or more embodiments of the present disclosure, the first supporting surface includes a first subsidiary supporting surface and a second subsidiary supporting surface. The first subsidiary supporting surface is farther away from the base plate than the second subsidiary supporting surface from the base plate. The first subsidiary supporting surface is adjacent with the second subsidiary supporting surface. The second subsidiary supporting surface is located at an inner side of the first rectangular frame relative to the first subsidiary supporting surface. The filtering module further includes a first supporting bar. The first supporting bar is disposed along a symmetrical line of the first rectangular frame. Two opposite ends of the first supporting bar are respectively connected with the corresponding second subsidiary supporting surface. The filtering mesh includes two subsidiary filtering meshes. The subsidiary filtering meshes are adjacent to each other. At least one of the subsidiary filtering meshes is at least partially supported on the first subsidiary supporting surface and the first supporting bar.

In one or more embodiments of the present disclosure, each of the subsidiary filtering meshes is a removable filtering mesh.

In one or more embodiments of the present disclosure, a quantity of the filtering mesh is plural. The first reinforced aluminum side plate further includes a protruding portion. The protruding portion is connected with the first top plate and is located at an outer side of the first rectangular frame. The filtering module further includes at least one second reinforced aluminum side plate and a sealing element. The second reinforced aluminum side plate surrounds to form a second rectangular frame. The second reinforced aluminum side plate includes a second top plate, a second connecting plate, a lower portion and a second positioning plate. The second connecting plate is connected between the second top plate and the lower portion. The lower portion has a recessed portion aligning with the second connecting plate and configured to accommodate the first positioning plate. The second top plate has a second supporting surface away from the lower portion. The second positioning plate is disposed perpendicularly on the second supporting surface and aligns with the second connecting plate. At least one of the filtering meshes is at least partially supported on the second supporting surface and at least partially abuts against the second positioning plate. The sealing element is compressed between the protruding portion and the lower portion.

In one or more embodiments of the present disclosure, a quantity of the second rectangular frame is plural. The second rectangular frames are mutually stacked. The corresponding second positioning plate of one of the second rectangular frames is accommodated in the corresponding recessed portion of the adjacent one of the second rectangular frames.

In one or more embodiments of the present disclosure, an edge of the second top plate facing to an inner side of the second rectangular frame defines a second vent. A dimension of the filtering mesh is larger than a dimension of the second vent.

In one or more embodiments of the present disclosure, the second supporting surface includes a third subsidiary supporting surface and a fourth subsidiary supporting surface. The third subsidiary supporting surface is farther away from the lower portion than the fourth subsidiary supporting surface from the lower portion. The third subsidiary supporting surface is adjacent with the fourth subsidiary supporting surface. The fourth subsidiary supporting surface is located at an inner side of the second rectangular frame relative to the third subsidiary supporting surface. The filtering module further includes a second supporting bar. The second supporting bar is disposed along a symmetrical line of the second rectangular frame. Two opposite ends of the second supporting bar are respectively connected with the corresponding fourth subsidiary supporting surface. At least one of the subsidiary filtering meshes is at least partially supported on the third subsidiary supporting surface and the second supporting bar.

In one or more embodiments of the present disclosure, the first top plate and the base plate have a first distance therebetween. The second top plate and the first plate have a second distance therebetween. The first distance is larger than the second distance.

When compared with the prior art, the above-mentioned embodiments of the present disclosure have at least the following advantages:

(1) Since the treated surface of the base plate has a high level of flatness, the degree of tightness between the first rectangular frame and the fan filtering unit can be effectively enhanced. Thus, in the process that the filtered air is delivered to the next working space, the filtered air does not leak away between the first rectangular frame and the fan filtering unit. On the other hand, unfiltered air does not infiltrate from the outside through the connection between the first rectangular frame and the fan filtering unit. Therefore, the quality of the filtered air entering into the working space is enhanced.

(2) Since the material of the first reinforced aluminum side plate is reinforced aluminum, the situation of structural deformation of the first rectangular frame formed from surrounding the first reinforced aluminum side plate is unlikely to happen. In this way, the degree of tightness between the first rectangular frame and the fan filtering unit can be effectively enhanced.

BRIEF DESCRIPTION OF THE DRAWINGS

The disclosure can be more fully understood by reading the following detailed description of the embodiments, with reference made to the accompanying drawings as follows.

DETAILED DESCRIPTION

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
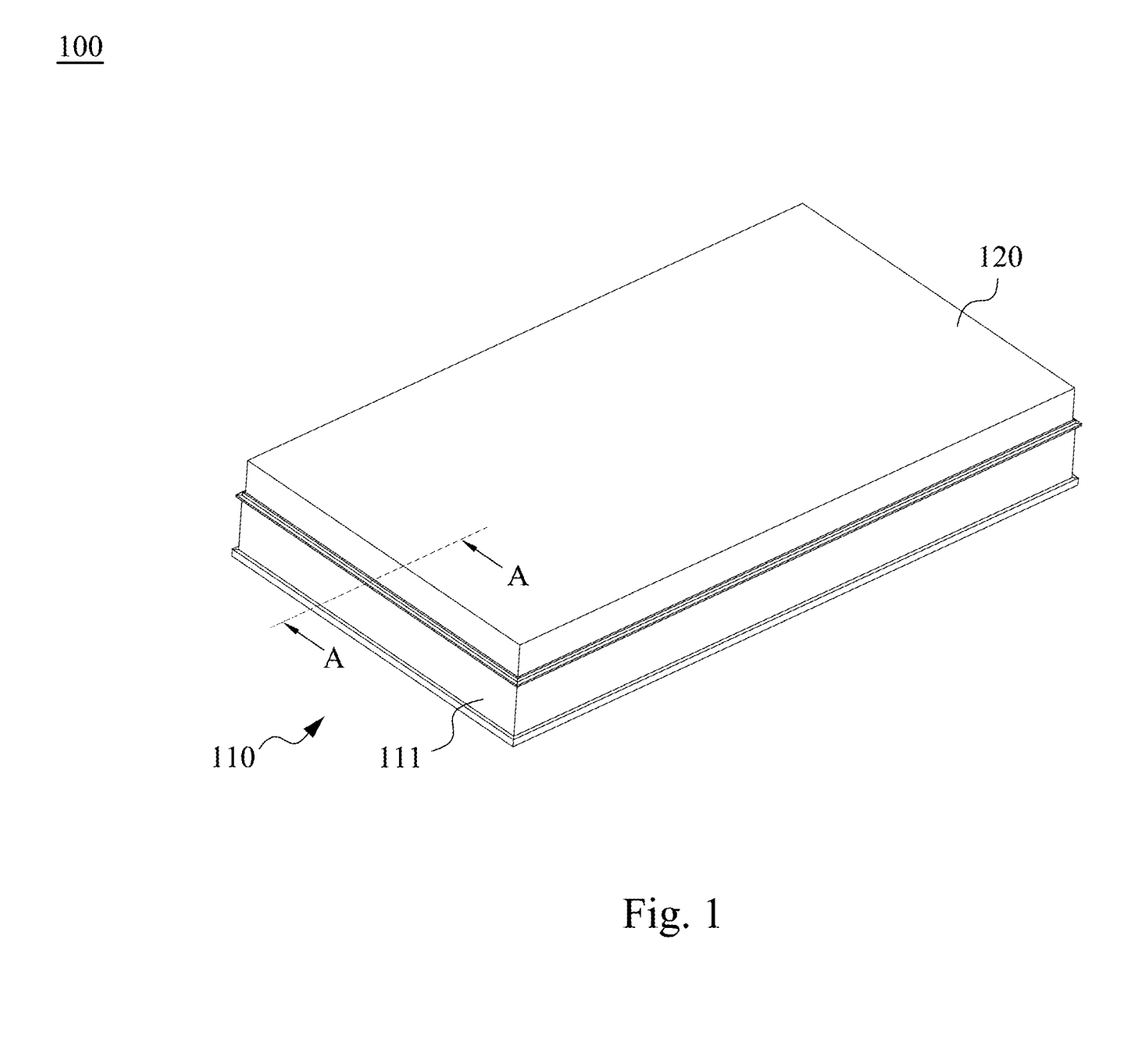
FIG. 1 is a schematic view of a filtering module according to an embodiment of the present disclosure.
Figure 2:
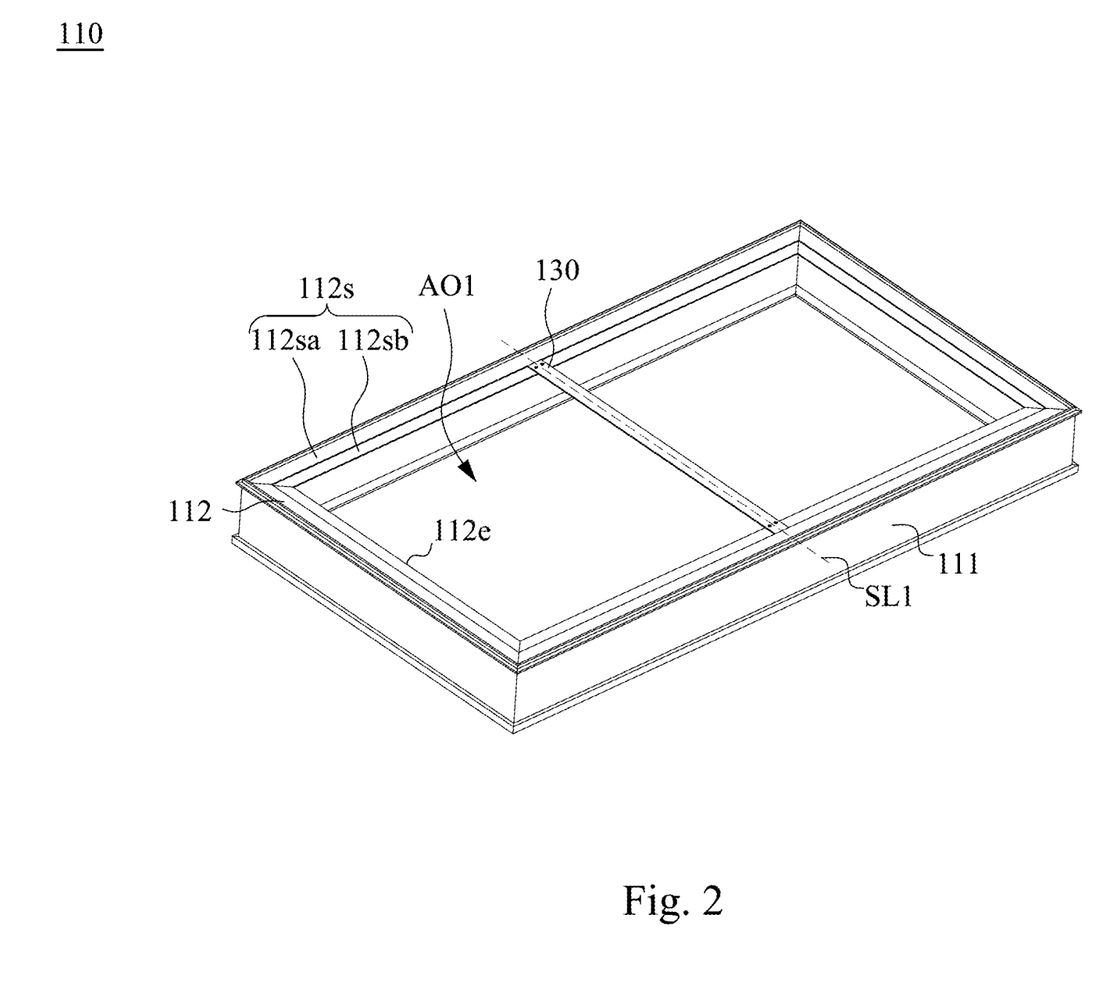
FIG. 2 is a schematic view of the first rectangular frame of FIG. 1.
Figure 3:
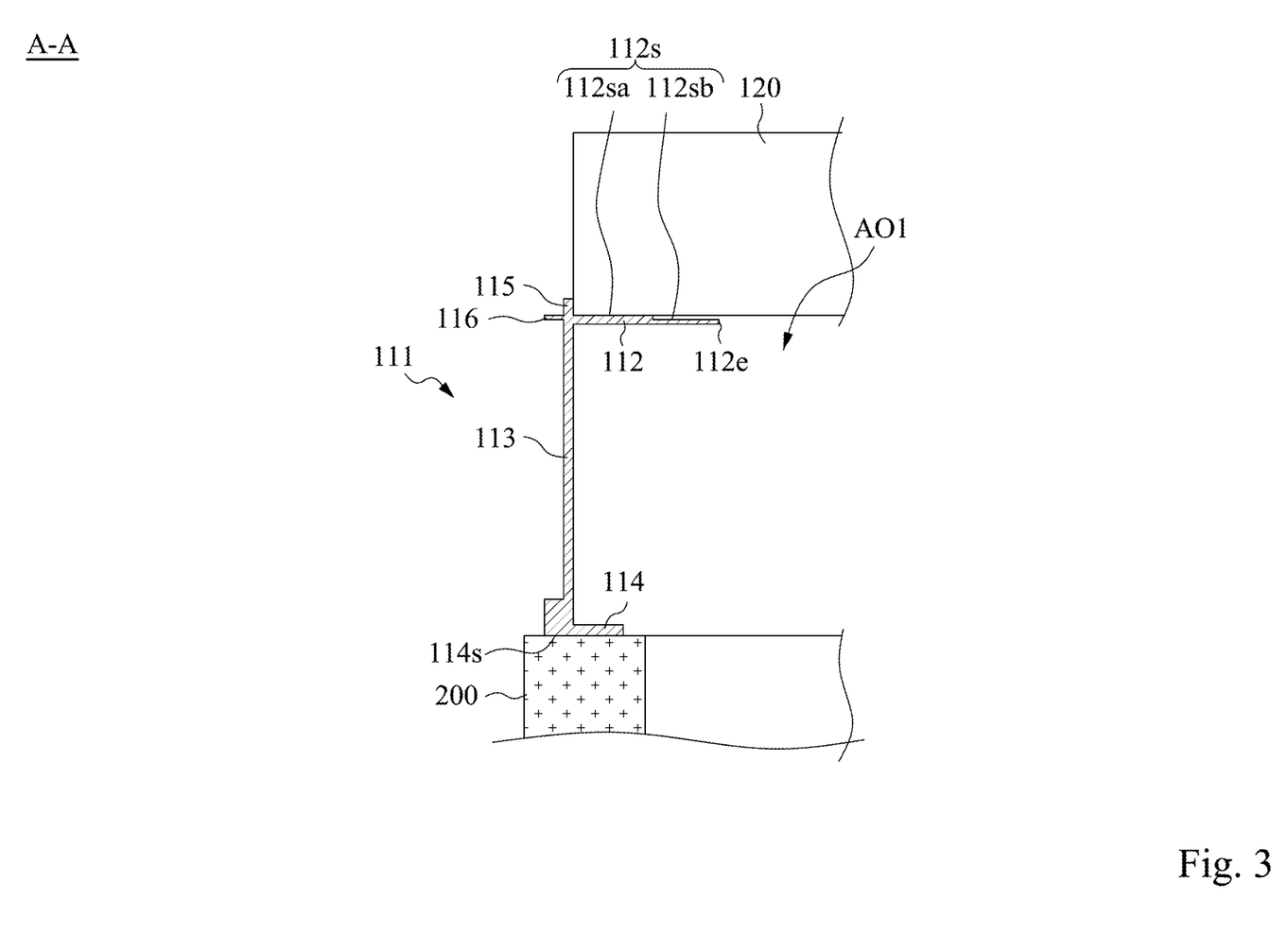
FIG. 3 is a sectional view along the section line A-A of FIG. 1.

Reference is made to FIGS. 1-3. FIG. 1 is a schematic view of a filtering module 100 according to an embodiment of the present disclosure. FIG. 2 is a schematic view of the first rectangular frame 110 of FIG. 1. FIG. 3 is a sectional view along the section line A-A of FIG. 1. In this embodiment, as shown in FIGS. 1-3, a filtering module 100 includes a first reinforced aluminum side plate 111 and at least one filtering mesh 120. The first reinforced aluminum side plate 111 surrounds to form a first rectangular frame 110. The first reinforced aluminum side plate 111 includes a first top plate 112, a first connecting plate 113, a base plate 114 and a first positioning plate 115. The first connecting plate 113 is connected between the first top plate 112 and the base plate 114. The base plate 114 and the first top plate 112 are substantially parallel with each other. The base plate 144 has a treated surface 144s. The treated surface 144s is away from the first top plate 112 and is configured to abut against a fan filtering unit 200 (please refer to FIG. 3). The first top plate 112 has a first supporting surface 112s. The first supporting surface 112s is away from the base plate 114. The first positioning plate 115 is disposed perpendicularly on the first supporting surface 112s and aligns with the first connecting plate 113. The filtering mesh 120 is at least partially supported on the first supporting surface 112s and at least partially abuts against the first positioning plate 115.

In practical applications, the treated surface 114s of the base plate 114 is a flat surface. For example, the treated surface 114s can be formed as a flat surface by the following methods of surface treatment, which include, but not limited to, sandblasting (to form a matte pearly silver surface), polishing (to form a mirror surface), wire drawing (to achieve a satin-like effect), electroplating (to cover a metallic layer thereon) and spraying (to cover a non-metallic layer thereon), etc. By forming the treated surface 114s as a flat surface, i.e., making the treated surface 114s to have a high level of flatness, when the treated surface 114s of the base plate 114 abuts against the fan filtering unit 200, the degree of tightness between the first rectangular frame 110 and the fan filtering unit 200 can be effectively enhanced.

When the fan filtering unit 200 operates, air passes through the filtering mesh 120 and is filtered by the filtering mesh 120. The filtered air sequentially passes through the first rectangular frame 110 and the fan filtering unit 200, and is then delivered to the next working space, such as a dust-free room. As mentioned above, the degree of tightness between the first rectangular frame 110 and the fan filtering unit 200 can be effectively enhanced. Thus, in the process that the filtered air is delivered to the next working space, the filtered air does not leak away between the first rectangular frame 110 and the fan filtering unit 200. On the other hand, unfiltered air does not infiltrate from the outside through the connection between the first rectangular frame 110 and the fan filtering unit 200. Therefore, the quality of the filtered air entering into the working space is enhanced.

In addition, it is worth to note that, the material of the first reinforced aluminum side plate 111 is reinforced aluminum. Thus, the situation of structural deformation of the first rectangular frame 110 formed from surrounding the first reinforced aluminum side plate 111 is unlikely to happen. In this way, the degree of tightness between the first rectangular frame 110 and the fan filtering unit 200 can be effectively enhanced.

In the structural point of view, in this embodiment, an edge 112e of the first top plate 112 facing to an inner side of the first rectangular frame 110 defines a first vent AO1 (please refer to FIGS. 2-3 for the edge 112e and the first vent AO1), and a dimension of the filtering mesh 120 is larger than a dimension of the first vent AO1.

In this embodiment, the filtering mesh 120 is a frameless filtering cloth. For example, in situations where the on-site environment is poor, such as in the initial stage of plant construction, users can first perform preliminary filtering and purification of the environment using the frameless filtering cloth at a lower cost.

Moreover, as shown in FIGS. 2-3, the first supporting surface 112s of the first top plate 112 includes a first subsidiary supporting surface 112sa and a second subsidiary supporting surface 112sb. The first subsidiary supporting surface 112sa is farther away from the base plate 114 than the second subsidiary supporting surface 112sb from the base plate 114. The first subsidiary supporting surface 112sa is adjacent with the second subsidiary supporting surface 112sb. The second subsidiary supporting surface 112sb is located at an inner side of the first rectangular frame 110 relative to the first subsidiary supporting surface 112sa. Furthermore, as shown in FIG. 2, the filtering module 100 further includes a first supporting bar 130. The first supporting bar 130 is disposed along a symmetrical line SL1 of the first rectangular frame 110, and two opposite ends of the first supporting bar 130 are respectively connected with the corresponding second subsidiary supporting surface 112sb.

Figure 4:
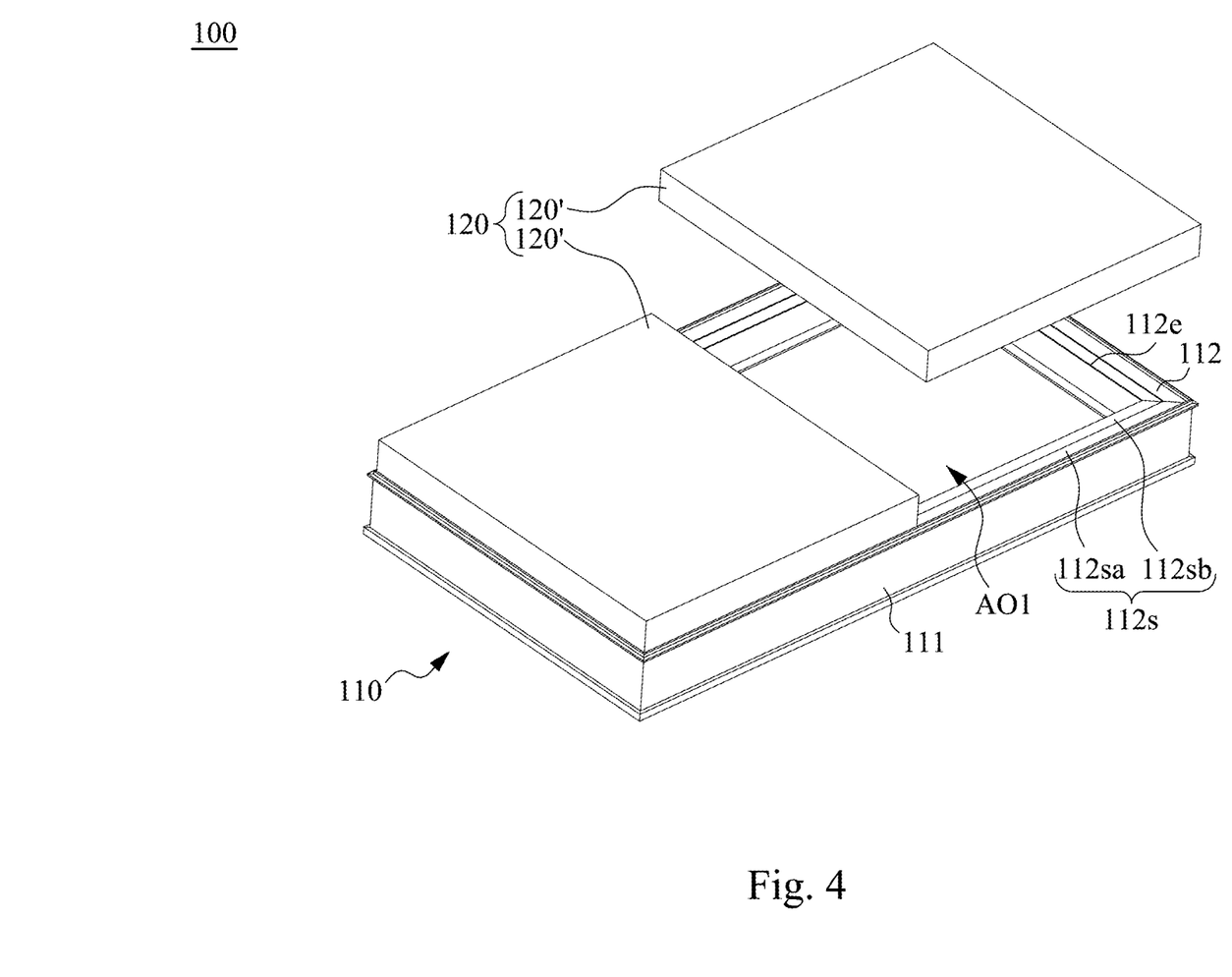
FIG. 4 is a schematic view of a filtering module according to another embodiment of the present disclosure, in which the filtering mesh includes two subsidiary filtering meshes.

Reference is made to FIG. 4. FIG. 4 is a schematic view of a filtering module 100 according to another embodiment of the present disclosure, in which the filtering mesh 120 includes two subsidiary filtering meshes 120'. In this embodiment, as shown in FIG. 4, the filtering mesh 120 includes two subsidiary filtering meshes 120', and the subsidiary filtering meshes 120' are adjacent to each other. Moreover, at least one of the subsidiary filtering meshes 120' is at least partially supported on the first subsidiary supporting surface 112sa and the first supporting bar 130 (please see FIG. 2 for the first supporting bar 130). In practical applications, each of the subsidiary filtering meshes 120' can be a removable filtering mesh. For the sake of easy understanding of the figures, in FIG. 4, one of the subsidiary filtering meshes 120' is supported on the first rectangular frame 110, and another one of the subsidiary filtering meshes 120' is ready to be supported on the first rectangular frame 110.

Figure 5:
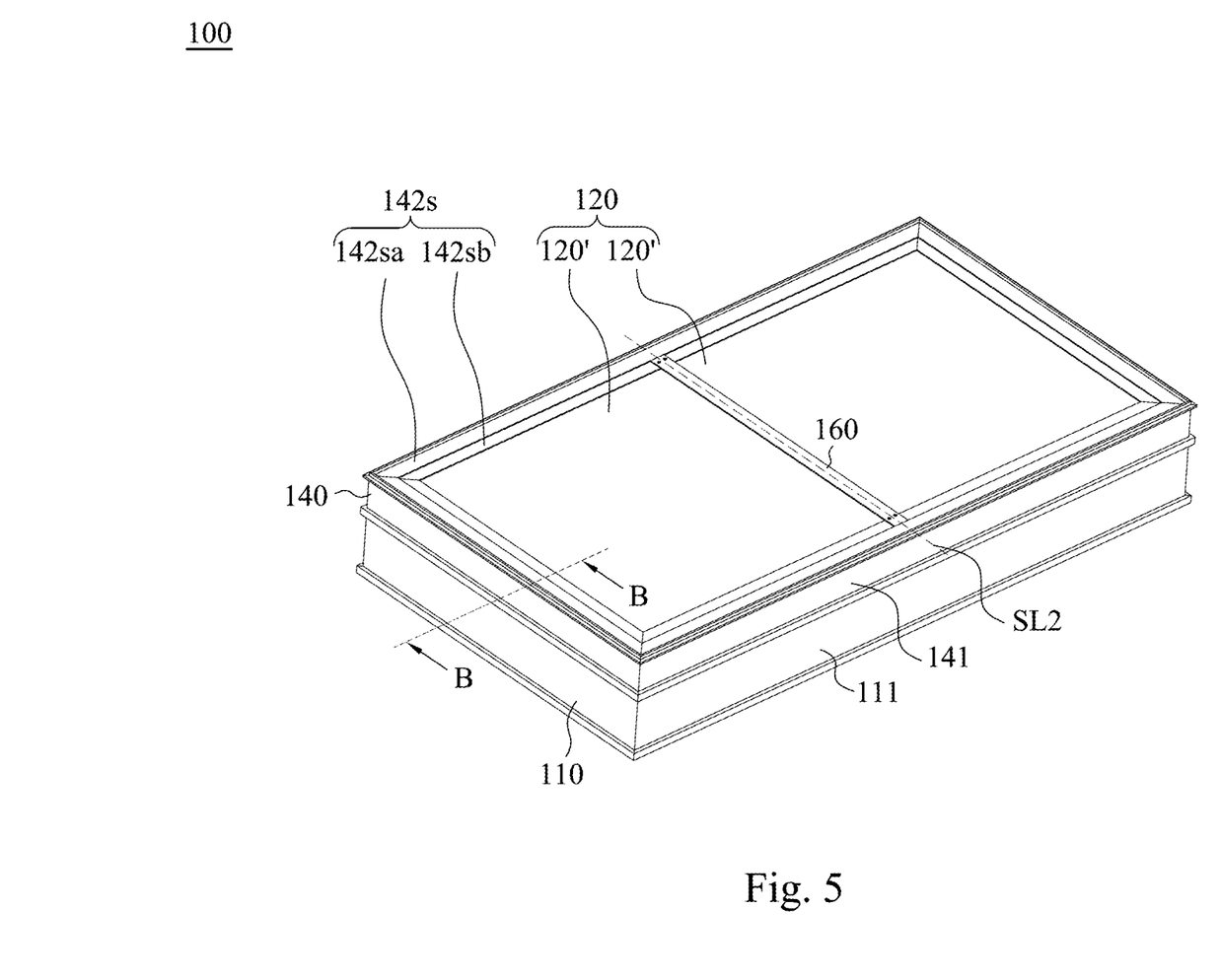
FIG. 5 is a schematic view of a filtering module according to a further embodiment of the present disclosure, in which the second rectangular frame is stacked on top of the first rectangular frame.
Figure 6:
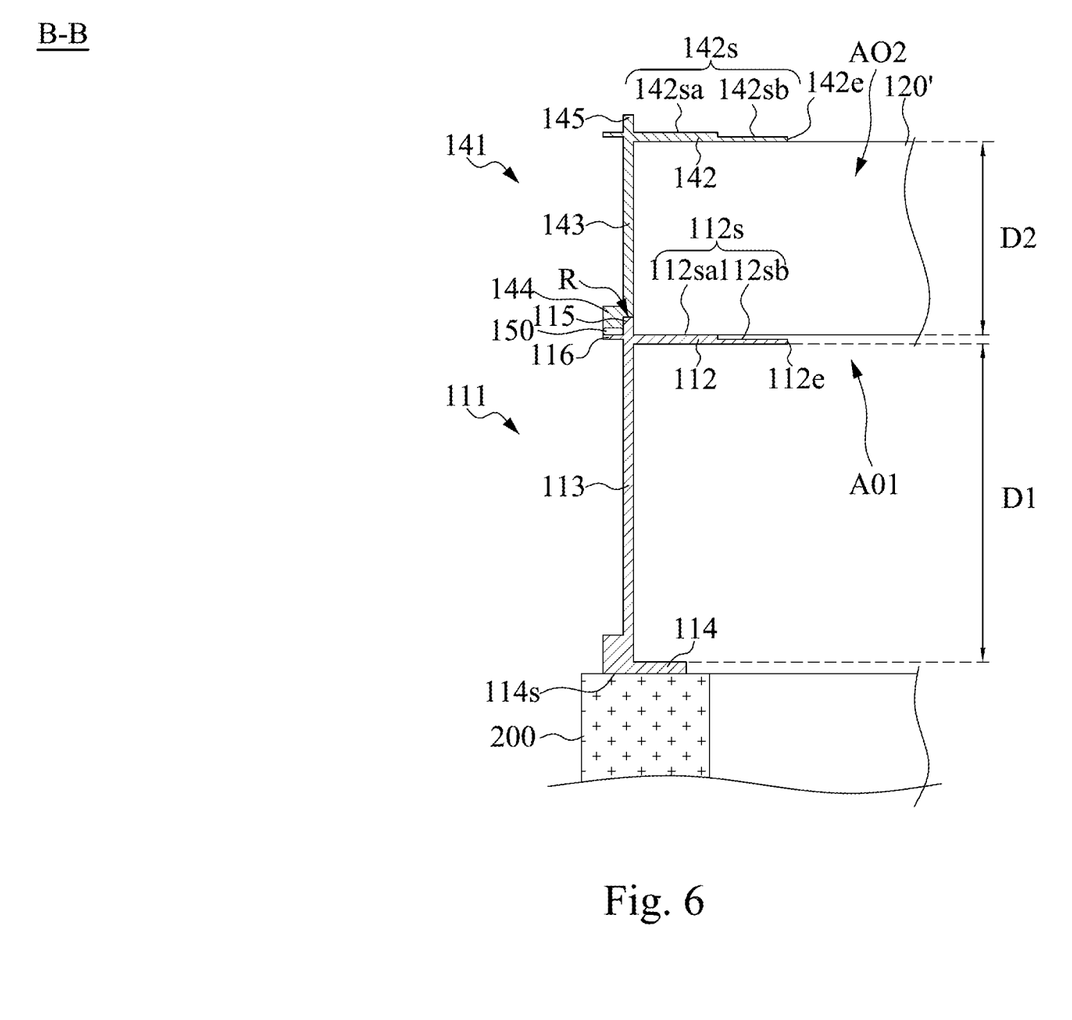
FIG. 6 is a sectional view along the section line B-B of FIG. 5.

Reference is made to FIGS. 5-6. FIG. 5 is a schematic view of a filtering module 100 according to a further embodiment of the present disclosure, in which the second rectangular frame 140 is stacked on top of the first rectangular frame 110. FIG. 6 is a sectional view along the section line B-B of FIG. 5. In this embodiment, as shown in FIGS. 5-6, the filtering module 100 further includes at least one second reinforced aluminum side plate 141 and a sealing element 150. The second reinforced aluminum side plate 141 surrounds to form a second rectangular frame 140. The second reinforced aluminum side plate 141 includes a second top plate 142, a second connecting plate 143, a lower portion 144 and a second positioning plate 145. The second connecting plate 143 is connected between the second top plate 142 and the lower portion 144. The lower portion 144 has a recessed portion R. The recessed portion R aligns with the second connecting plate 143 and is configured to accommodate the first positioning plate 115 of the first reinforced aluminum side plate 111. The second top plate 142 has a second supporting surface 142s. The second supporting surface 142s is away from the lower portion 144. The second positioning plate 145 is disposed perpendicularly on the second supporting surface 142s and aligns with the second connecting plate 143. Moreover, the first reinforced aluminum side plate 111 further includes a protruding portion 116. The protruding portion 116 is connected with the first top plate 112 and is located at an outer side of the first rectangular frame 110. Furthermore, the sealing element 150 is compressed between the protruding portion 116 of the first reinforced aluminum side plate 111 and the lower portion 144 of the second reinforced aluminum side plate 141, such that the degree of tightness between the first rectangular frame 110 and the second rectangular frame 140 is effectively enhanced.

Similarly, an edge 142e of the second top plate 142 of the second reinforced aluminum side plate 141 facing to an inner side of the second rectangular frame 140 defines a second vent AO2, and a dimension of the filtering mesh 120 (i.e., the two subsidiary filtering meshes 120') is larger than a dimension of the second vent AO2.

It is worth to note that, as shown in FIG. 6, the first top plate 112 and the base plate 114 of the first rectangular frame 110 have a first distance D1 therebetween. The second top plate 142 of the second rectangular frame 140 and the first plate 112 of the first rectangular frame 110 have a second distance D2 therebetween. In this embodiment, the first distance D1 is larger than the second distance D2.

In addition, the second supporting surface 142s of the second top plate 142 includes a third subsidiary supporting surface 142sa and a fourth subsidiary supporting surface 142sb. The third subsidiary supporting surface 142sa is farther away from the lower portion 144 than the fourth subsidiary supporting surface 142sb from the lower portion 144. The third subsidiary supporting surface 142sa is adjacent with the fourth subsidiary supporting surface 142sb. The fourth subsidiary supporting surface 142sb is located at an inner side of the second rectangular frame 140 relative to the third subsidiary supporting surface 142sa. Furthermore, the filtering module 100 further includes a second supporting bar 160 (please see FIG. 5 for the second supporting bar 160). The second supporting bar 160 is disposed along a symmetrical line SL2 of the second rectangular frame 140, and two opposite ends of the second supporting bar 160 are respectively connected with the corresponding fourth subsidiary supporting surface 142sb, as shown in FIG. 5.

Figure 7:
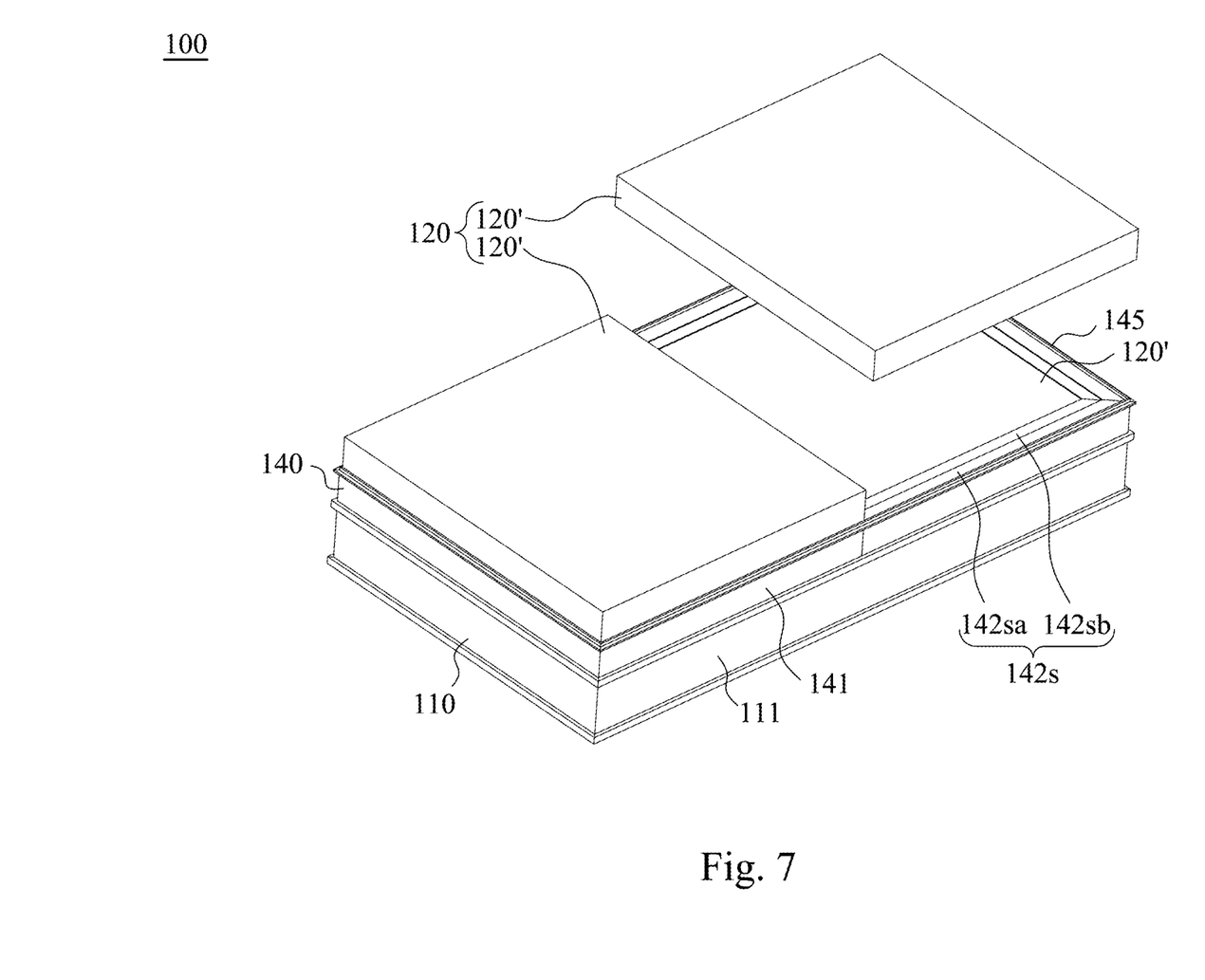
FIG. 7 is a schematic view of a filtering module according to another embodiment of the present disclosure.

Reference is made to FIG. 7. FIG. 7 is a schematic view of a filtering module 100 according to another embodiment of the present disclosure. In this embodiment, as shown in FIG. 7, a quantity of the filtering mesh 120 is plural, and one of the filtering meshes 120 is at least partially supported on the second supporting surface 142s and at least partially abuts against the second positioning plate 145 (please also refer to FIG. 6 for the second positioning plate 145). To be more specific, at least one of the subsidiary filtering meshes 120' is at least partially supported on the third subsidiary supporting surface 142sa and the second supporting bar 160

(please refer to FIG. 5 for the second supporting bar 160). For the sake of easy understanding of the figures, in FIG. 7, one of the subsidiary filtering meshes 120' is supported on the second rectangular frame 140, and another one of the subsidiary filtering meshes 120' is ready to be supported on the second rectangular frame 140.

Figure 8:
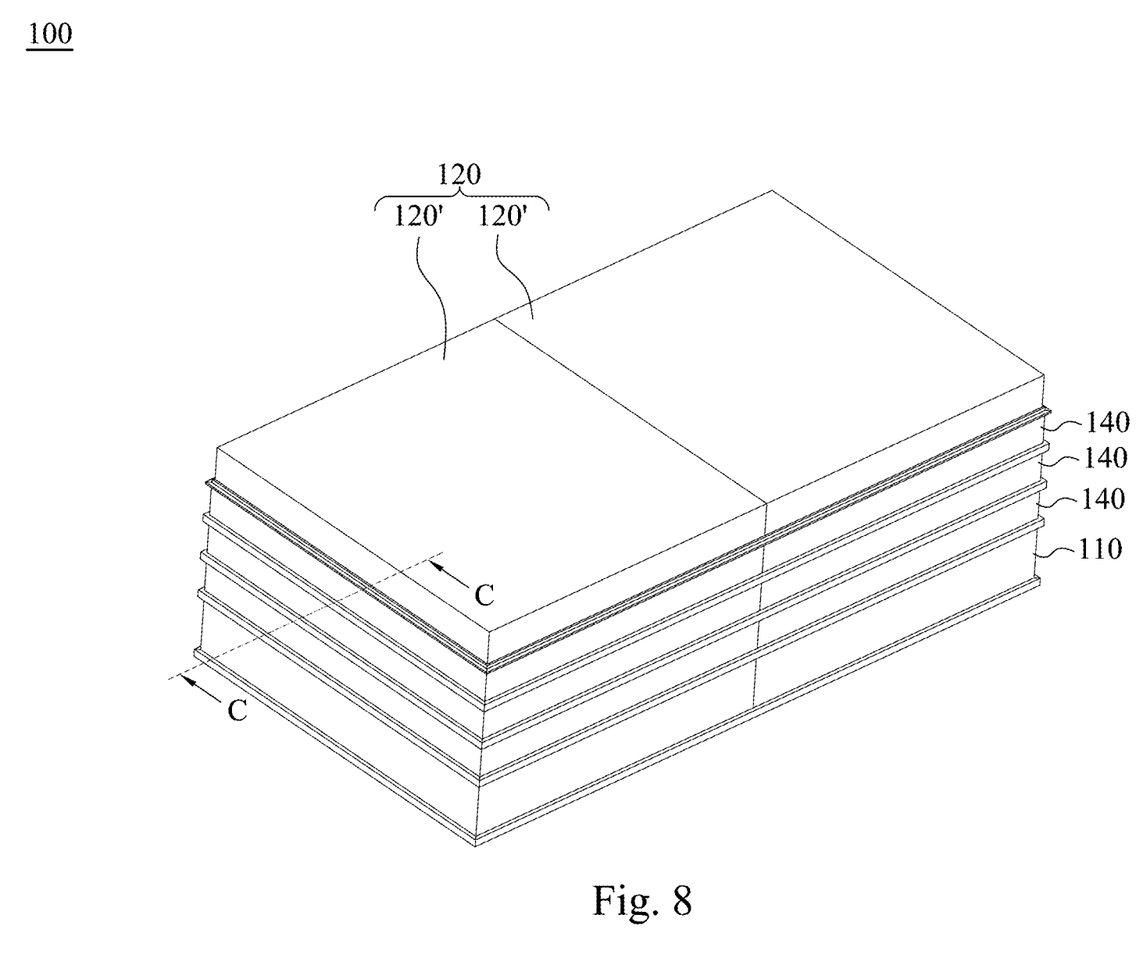
FIG. 8 is a schematic view of a filtering module according to a further embodiment of the present disclosure.
Figure 9:
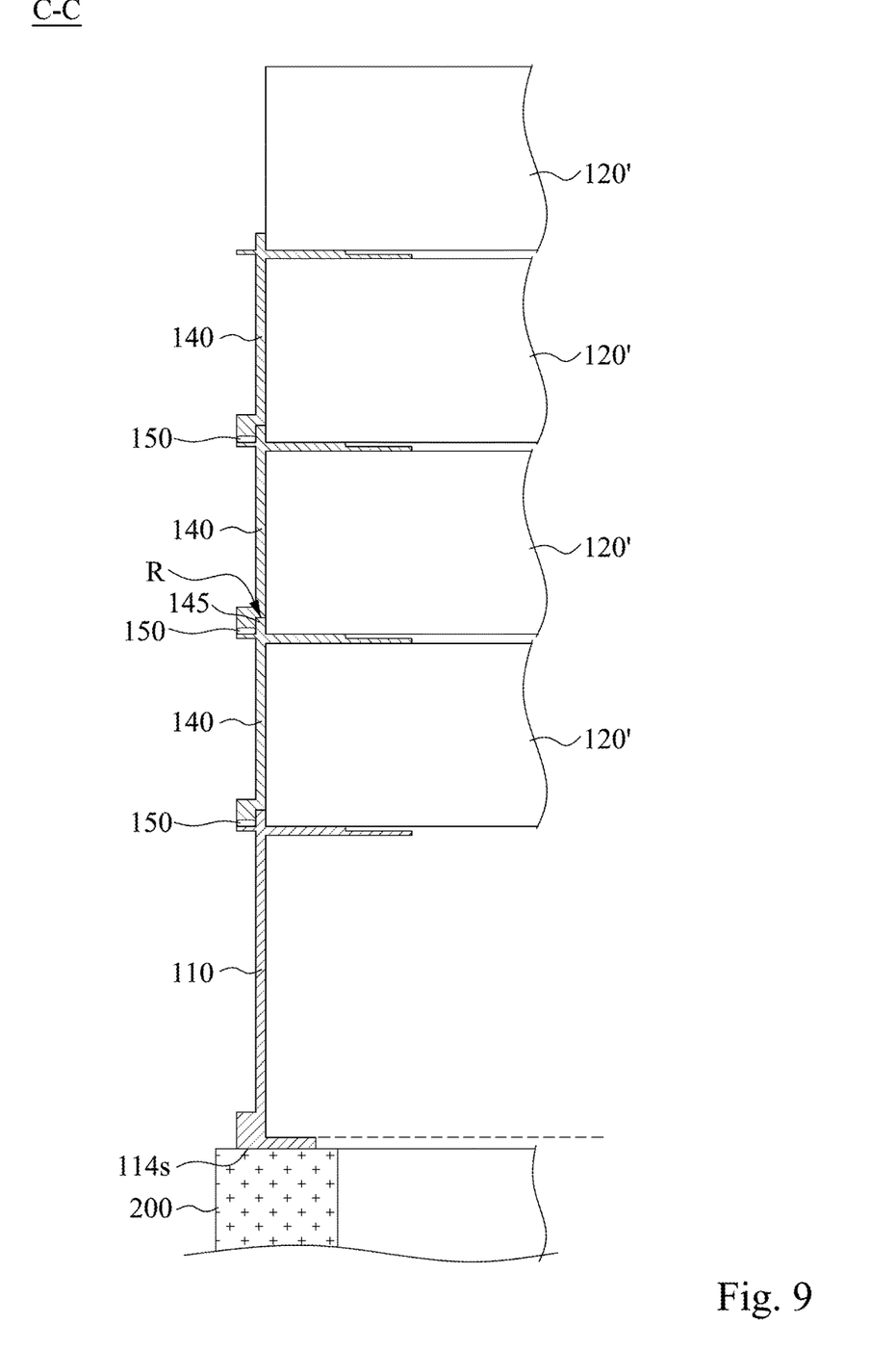
FIG. 9 is a sectional view along the section line C-C of FIG. 8.

Reference is made to FIGS. 8-9. FIG. 8 is a schematic view of a filtering module 100 according to a further embodiment of the present disclosure. FIG. 9 is a sectional view along the section line C-C of FIG. 8. In this embodiment, as shown in FIGS. 8-9, a quantity of the second rectangular frame 140 is plural. The second rectangular frames 140 are mutually stacked. The corresponding second positioning plate 145 of one of the second rectangular frames 140 is accommodated in the corresponding recessed portion R of the adjacent one of the second rectangular frames 140. To be more specific, as shown in FIG. 9, the second positioning plate 145 of the second rectangular frame 140 located below is accommodated in the recessed portion R of the second rectangular frame 140 located above.

In conclusion, when compared with the prior art, the aforementioned embodiments of the present disclosure have at least the following advantages:

(1) Since the treated surface of the base plate has a high level of flatness, the degree of tightness between the first rectangular frame and the fan filtering unit can be effectively enhanced. Thus, in the process that the filtered air is delivered to the next working space, the filtered air does not leak away between the first rectangular frame and the fan filtering unit. On the other hand, unfiltered air does not infiltrate from the outside through the connection between the first rectangular frame and the fan filtering unit. Therefore, the quality of the filtered air entering into the working space is enhanced.

(2) Since the material of the first reinforced aluminum side plate is reinforced aluminum, the situation of structural deformation of the first rectangular frame formed from surrounding the first reinforced aluminum side plate is unlikely to happen. In this way, the degree of tightness between the first rectangular frame and the fan filtering unit can be effectively enhanced.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A filtering module, comprising:
a first reinforced aluminum side plate surrounding to form a first rectangular frame, the first reinforced aluminum side plate comprising a first top plate, a first connecting plate, a base plate and a first positioning plate, the first connecting plate connecting between the first top plate and the base plate, the base plate and the first top plate being substantially parallel with each other, the base plate having a treated surface away from the first top plate and configured to abut against a fan filtering unit, the first top plate having a first supporting surface away from the base plate, the first positioning plate being disposed perpendicularly on the first supporting surface, the first positioning plate and the first connecting plate being located at opposite sides of the first top plate, the first positioning plate aligning with the first connecting plate; and
at least one first filtering mesh at least partially supported on the first supporting surface and at least partially abutting against the first positioning plate.

2. The filtering module of claim 1, wherein the treated surface is a flat surface.

3. The filtering module of claim 1, wherein an edge of the first top plate facing to an inner side of the first rectangular frame defines a first vent, a dimension of the first filtering mesh is larger than a dimension of the first vent.

4. The filtering module of claim 1, wherein the first filtering mesh is a frameless filtering cloth.

5. The filtering module of claim 1, wherein the first supporting surface comprises a first subsidiary supporting surface and a second subsidiary supporting surface, the first subsidiary supporting surface is farther away from the base plate than the second subsidiary supporting surface from the base plate, the first subsidiary supporting surface being adjacent with the second subsidiary supporting surface, the second subsidiary supporting surface being located at an inner side of the first rectangular frame relative to the first subsidiary supporting surface, the filtering module further comprises:
a first supporting bar disposed along a symmetrical line of the first rectangular frame, and two opposite ends of the first supporting bar respectively connect with the corresponding second subsidiary supporting surface,
wherein the first filtering mesh comprises two first subsidiary filtering meshes adjacent to each other, at least one of the first subsidiary filtering meshes is at least partially supported on the first subsidiary supporting surface and the first supporting bar.

6. The filtering module of claim 5, wherein each of the first subsidiary filtering meshes is a removable filtering mesh.

7. The filtering module of claim 5, wherein the first reinforced aluminum side plate further comprises a protruding portion, the protruding portion is connected with the first top plate and is located at an outer side of the first rectangular frame,
the filtering module further comprises:
at least one second reinforced aluminum side plate surrounding to form a second rectangular frame, the second reinforced aluminum side plate comprises a second top plate, a second connecting plate, a lower portion and a second positioning plate, the second connecting plate is connected between the second top plate and the lower portion, the lower portion has a recessed portion aligning with the second connecting plate and configured to accommodate the first positioning plate, the second top plate has a second supporting surface away from the lower portion, the second positioning plate is disposed perpendicularly on the second supporting surface and aligns with the second connecting plate;
at least one second filtering mesh at least partially supported on the second supporting surface and at least partially abutting against the second positioning plate; and
a sealing element compressed between the protruding portion and the lower portion.

8. The filtering module of claim 7, wherein a quantity of the second rectangular frame is plural, the second rectangular frames are mutually stacked, the corresponding second positioning plate of one of the second rectangular frames is accommodated in the corresponding recessed portion of the adjacent one of the second rectangular frames.

9. The filtering module of claim 7, wherein an edge of the second top plate facing to an inner side of the second rectangular frame defines a second vent, a dimension of the second filtering mesh is larger than a dimension of the second vent.

10. The filtering module of claim 7, wherein the second supporting surface comprises a third subsidiary supporting surface and a fourth subsidiary supporting surface, the third subsidiary supporting surface is farther away from the lower portion than the fourth subsidiary supporting surface from the lower portion, the third subsidiary supporting surface is adjacent with the fourth subsidiary supporting surface, the fourth subsidiary supporting surface is located at an inner side of the second rectangular frame relative to the third subsidiary supporting surface, the filtering module further comprises:

a second supporting bar disposed along a symmetrical line of the second rectangular frame, and two opposite ends of the second supporting bar respectively connect with the corresponding fourth subsidiary supporting surface, wherein the second filtering mesh comprises two second subsidiary filtering meshes adjacent to each other, at least one of the second subsidiary filtering meshes is at least partially supported on the third subsidiary supporting surface and the second supporting bar.

11. The filtering module of claim 7, wherein the first top plate and the base plate have a first distance therebetween, the second top plate and the first top plate have a second distance therebetween, the first distance is larger than the second distance.

* * * * *